Feb. 10, 1942.  T. E. McDOWELL ET AL  2,272,178
FITTING
Filed Dec. 24, 1938
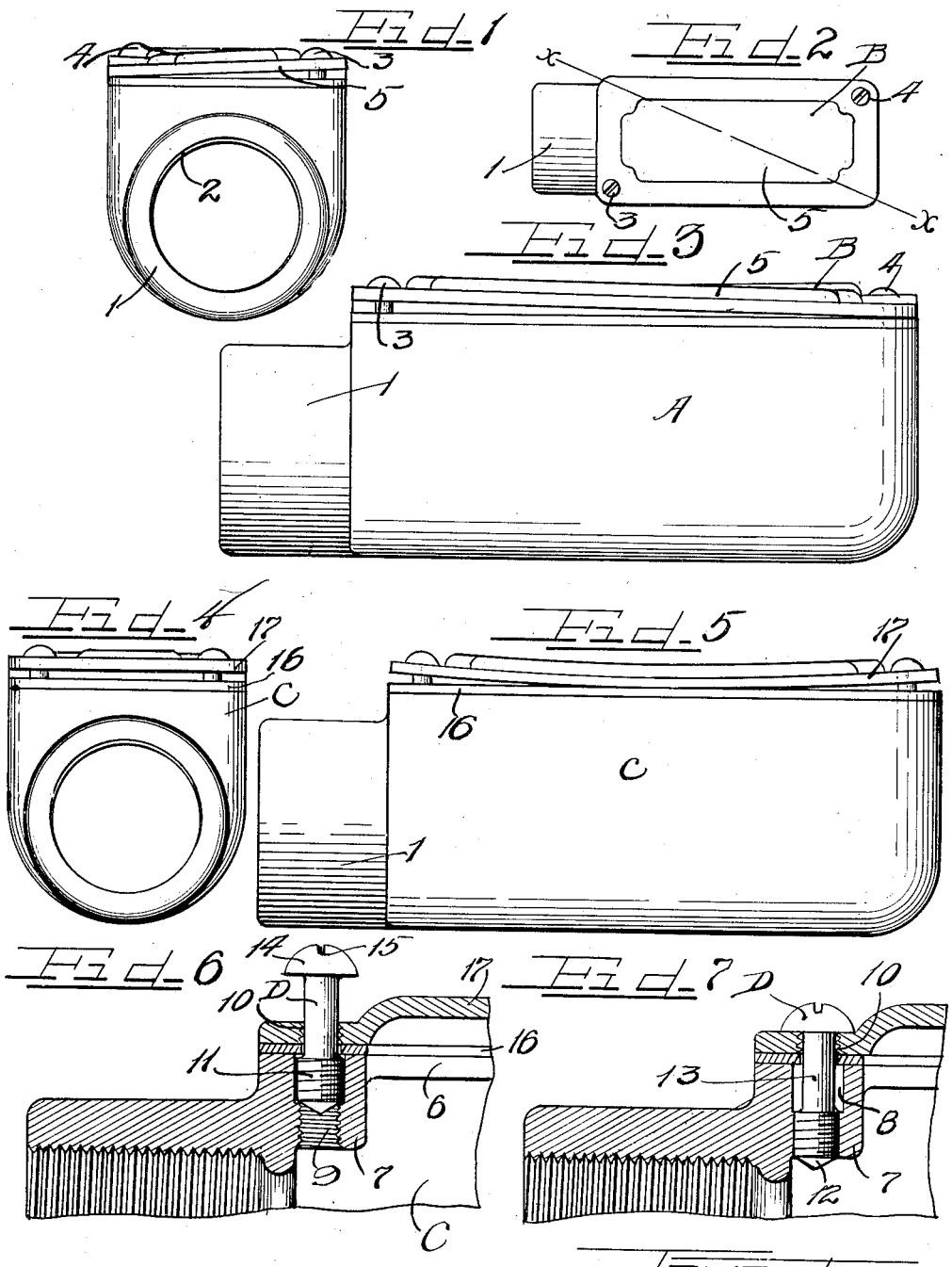

Patented Feb. 10, 1942

2,272,178

UNITED STATES PATENT OFFICE 2,272,178

FITTING

Thomas E. McDowell and William A. Wulle, Chicago, Ill., assignors to The Pyle-National Company, Chicago, Ill., a corporation of New Jersey Application December 24, 1938, Serial No. 247,548

1 Claim. (Cl. 220—24)

The present invention relates to fitting, and more particularly to fittings for electric conduits.

An object of the present invention is to provide a conduit box with a warped cover so that when the cover is tightened against the box opening a leak tight joint is provided.

Another object of the present invention is to provide a construction for receiving the cover or lid attaching screws, in which the screws enter through counterbores prior to engaging the threaded screw apertures in the fitting. This construction enables the screws to act as guides in applying the cover in place.

A further object is an arrangement in which the counterbores are greater in length than the axial length of the threaded portions of the screws, so that the screws may be withdrawn from their threaded engagement without the likelihood of accidentally withdrawing the screws from the cover.

A still further object of the present invention is to provide a sealing gasket about the marginal portion of the cover with holes for surrounding the screw shanks which holes are of smaller diameter than the threaded portions of the screws to thereby prevent accidental loss of the gasket whenever a cover is removed from its box.

Another and still further object of the present invention is to provide a warped cover so warped that as the attaching screws are tightened the cover is progressively bent into place thereby applying pressure throughout the entire surface of the margin defining the opening the cover closes.

The invention has for another object the provision of a conduit box and cover so arranged that the cover may be guided in place and readily held in place until the screws are tightened, the screws acting as guide means in the application of the cover to the box.

The above, other and further objects of the present invention will be apparent from the following description and accompanying drawing.

Embodiments of the present invention appear in the drawing and the views thereof are as follows:

Figure 1 is an end view of a fitting having a warped cover adapted to be held in place by two screws at diagonally opposite corners of the cover.

Figure 2 is a top plan view of a fitting with the two screw cover secured in place.

Figure 3 is a side elevational view of an outlet box having a warped cover applied to it with the cover in the position that it assumes prior to the tightening of the screws for holding it in place.

Figure 4 is a view similar to Figure 1, in which a cover is warped between its ends, and is arranged for application by means of four screws through the corners of the cover.

Figure 5 is a side elevational view of a conduit box with a cover warped transversely between its ends, showing the cover as it appears prior to the tightening of the screws.

Figure 6 is an enlarged fragmental sectional view through one corner of the box and cover showing details of the counterbored portion for reception of the tightening screws, and showing the threaded portion of the screw out of engagement with the threaded aperture.

Figure 7 is a similar view, with the screw threaded to seal the cover against the fitting.

The drawing will now be explained.

The outlet box or fitting A is provided with an oblong opening through one of its side surfaces and at an end with a cylindrical neck 1 which is interiorly threaded at 2 to receive a conduit pipe connection.

For normally closing the side opening a cover or lid B is provided which cover is of suitable shape and size to completely overlie the side opening. In the form of the invention illustrated in Figures 1 to 3 inclusive, attaching screws 3 and 4 pass through openings in diagonally opposite corners of the cover B. The cover is warped along a line XX which passes through the other diagonal corners of the cover, the warping being convex as concerns the inner surface of the cover, that is, the surface which engages the margin of the opening through the conduit fitting.

For strengthening purposes, the central portion of the cover is offset as at 5.

The warped cover may be readily observed in Figures 1 and 3, Figure 1 showing an end view, and Figure 3 a side view of the warped cover.

Referring to Figures 6 and 7, the novel attaching screw arrangement of the present invention will be readily apparent.

In forming the fitting A wherein two screws 3 and 4 are utilized for securing the cover B in place, and also in forming the fitting C wherein four screws are utilized for securing the cover in place, at such corners of the fitting opening 6, which is closed by the cover, integral portions 7 are formed. These portions are counterbored at 8, opening at their outer ends through the margin of the fitting opening 6 and are unthreaded. Parts of the portions 7, inwardly of the margin of the fitting opening 6, are bored and tapped as at 9, the diameters of the counterbores being slightly greater than the diameters of the tapped openings 9. Such corners of a cover as receive screws are drilled and tapped as at 10 to each receive a screw, such as a screw D.

The attaching screws D have threaded portions 11, pointed extremities 12, shank portions 13 having diameters less than the diameters of the threaded portions 11 and heads 14 which heads are slotted at 15 to receive a screwdriver blade.

A gasket 16 shaped to fit between a cover and the margin of the side opening 6 in a fitting is bored in register with the tapped holes 10 in the cover with the diameter of such gasket holes less than the diameter of the counterbored portion 8.

In applying screws to a cover, these are threaded through the tapped holes 10 in the cover, through the openings in the gasket, until the shank portions 13 of the screws work freely in the tapped holes 10 and the holes in the gasket. This construction prevents loss of screws when the cover is removed from a box, or during the time a cover is being applied to a fitting or box.

By reason of the construction thus described, when the cover is applied to a box, the screws enter the counterbored portions thus positioning the cover in place without making it necessary for the operator to individually guide every screw into its threaded aperture.

The fact that the axial length of the counterbored portion is greater than the axial length of the threaded portions of the screws makes it possible to unscrew the screws from the tapped openings 9 without unintentionally unscrewing the screws through the tapped openings 10 in the cover. This thus prevents accidental removal of the screws from the cover, a factor of great importance.

The conduit fitting C illustrated in Figures 4 and 5 is provided with a cover or lid 17 which is bowed transversely of the length of the lid, as illustrated in Figure 5, making the inner surface of the cover of convex formation. Screws D are arranged in the four corners through suitable threaded apertures such as that designated 10 in Figures 6 and 7. In tightening the screws, the lid is progressively bent against the gasket 16 so that when the screws are home a leak tight seal is afforded throughout the area of the portion of the fitting closed by the cover.

The fact that the covers are bowed causes the covers to act with lock washer action, when the screws are home, thus preventing accidental loosening of the screws and breakage of the leak tight seal between a fitting and its cover.

The cover is made of metal capable of taking a set and also capable of being flattened.

When a cover of the present invention is applied to a fitting, to close its opening, the workman places the cover against the opening, and the pointed extremities 12 of the screws enter the counterbored unthreaded openings 8, thereby acting as dowel pins to position the cover. This feature is of special importance when a fitting is so installed as to present its opening in overhead position, or in some other position which makes it awkward for easy application of the cover. The screws are then tightened, flattening the warped cover, thus effecting a joint which is sealed throughout its extent.

In removing a cover the workman presses his screwdriver against a screw while unscrewing it, to maintain the blade in the screw slot. Such pressure against the screw will prevent its threaded end portion 11 from engaging the threaded hole 10 in the cover, no matter how much the screw is turned in unthreading direction, after disengagement from its threaded hole 9. It will be thus observed that there is no probability of a screw being lost from its cover.

The fact that the screw holes in the gasket are slightly less in diameter than the threaded ends 11 of the screws, serves to prevent loss of a gasket when a cover is removed from its fitting.

The covers or lids are made of material capable of being bent or warped to the original warped shapes, yet possessing enough spring to be flattened when applied in place, and to return to warped shape when removed from fittings.

The invention has been described herein more or less precisely as to details, yet it is to be understood that the invention is not limited thereby, as changes may be made in the arrangement and proportion of parts and equivalents may be substituted, without departing from the spirit and scope of the invention.

The invention is claimed as follows:

As an article of manufacture, a substantially rectangular metallic cover for an outlet box, said cover being warped on a line connecting two diagonally disposed corners thereof to position the other corners in spaced relation to the box, when the diagonally disposed corners are in contact therewith, and screw means carried by said other corners for attaching the cover in place and forcing the said other corners into a plane common with the diagonally disposed corners, whereby the tendency of the cover to resume warped shape acts to apply pressure against the screw means and retain the same against loosening.

THOMAS E. McDOWELL.
WILLIAM A. WULLE.